(12) United States Patent
Ricke

(10) Patent No.: US 6,997,137 B1
(45) Date of Patent: Feb. 14, 2006

(54) LITTER BOX CLEANING SYSTEM

(76) Inventor: Robert Ricke, 741 Forest Dr., Council Bluffs, IA (US) 51503

( * ) Notice: Subject to any disclaimer, the term of this patent is extended or adjusted under 35 U.S.C. 154(b) by 0 days.

(21) Appl. No.: 10/852,463

(22) Filed: May 24, 2004

(51) Int. Cl.
*A01K 29/00* (2006.01)

(52) U.S. Cl. ...................................... 119/168; 119/165
(58) Field of Classification Search ............... 119/165, 119/168
See application file for complete search history.

(56) References Cited

U.S. PATENT DOCUMENTS

| | | | |
|---|---|---|---|
| 3,482,546 A * | 12/1969 | Anderson | 119/166 |
| 3,621,817 A * | 11/1971 | Printz | 119/163 |
| 3,872,832 A * | 3/1975 | Quinn | 119/165 |
| 5,058,528 A * | 10/1991 | Counseller et al. | 119/165 |
| 5,178,099 A | 1/1993 | Lapps et al. | |
| 5,181,480 A | 1/1993 | Dabolt | |
| 5,517,947 A * | 5/1996 | Christman | 119/166 |
| 5,673,648 A | 10/1997 | Ayle | |
| 5,749,317 A * | 5/1998 | Richey et al. | 119/166 |
| 5,785,000 A | 7/1998 | Barbary | |
| 5,823,137 A * | 10/1998 | Rood et al. | 119/166 |
| 5,924,383 A | 7/1999 | Smith | |
| 6,182,612 B1 * | 2/2001 | Ross, Sr. | 119/482 |
| 6,295,948 B1 * | 10/2001 | Bowron | 119/165 |
| 6,401,660 B1 | 6/2002 | Wolff | |
| 6,701,868 B1 * | 3/2004 | Shepherd | 119/166 |

* cited by examiner

*Primary Examiner*—Teri Pham Luu
*Assistant Examiner*—Bret Hayes

(57) ABSTRACT

A litter box cleaning system includes an upright cabinet with a litter pan pivotally mounted in the upper end to move between a horizontal use position and a tilted dump position. A slot is formed in the pan front wall to dispense litter and waste material when the rearward end of the pan is lifted to the dump position. A waste receptacle in the cabinet is positioned below the pan slot such that litter and waste from the pan free-fall into the receptacle for storage and removal. In a second embodiment of the invention, the front wall of the pan is spaced away from the cabinet front wall, and a flap is hinged to the front of the pan to block litter material from falling from the slot.

16 Claims, 5 Drawing Sheets

LITTER BOX CLEANING SYSTEM

CROSS-REFERENCES TO RELATED APPLICATIONS (Not applicable)

STATEMENT AS TO RIGHTS TO INVENTIONS MADE UNDER FEDERALLY SPONSORED RESEARCH AND DEVELOPMENT (Not applicable)

BACKGROUND OF THE INVENTION

1. Field of the Invention

The present invention relates generally to animal litter boxes, and more particularly to an improved litter box with a system for removal of waste without requiring the consumer to contact the waste or bend over during clean-up operations.

2. Background Information

Litter boxes for various domestic animals have been in use for many years, and provide a convenient method of collecting and disposing of animal waste. Typically, prior art litter boxes include a plastic pan filled with an adsorbent material, known as litter. Waste material in the litter is manually scooped from the litter with a sieve-type scoop, and placed in a disposal container.

Several litter box systems have been disclosed which improve upon this basic concept. U.S. Pat. No. 5,178,099 to Lapps et al. discloses a litter box with a tray for holding granular absorbent litter material, a hood member connected with the tray having a pet access port, and a discharge chute at a rear wall thereof, with a retention chamber adjacent the rear wall of the hood, a filter grid overlying the retention chamber, a discharge funnel overlying the retention chamber and a disposal bag removably connected with the discharge chute. In operation, the litter box is pivoted to cause the litter material to slide toward the rear wall. Uncoagulated granular absorbent litter material passes through the filter grid into the retention chamber, while coagulated granular litter and feces slide along elongate members of the filter grid into the discharge funnel, out the chute and into the disposal bag. Reversing the pivot movement causes the "cleaned" litter within the retention chamber to pass again through the filter grid and into the tray for use as a litter box. While the screen portion that sifts the litter is separated by a wall in the box, the soiled screen is located within the same enclosure as the box, thereby permitting the odors from the soiled screen to permeate the air in the box.

U.S. Pat. No. 5,181,480 to Dabolt discloses a litter box with manually retractable floor sections. A litter refuse container with a refuse bag holder is located beneath the floor sections. As the floor sections are retracted, soiled litter falls to the bed directly below. The floor sections are cleaned by the action of scrapers along the sides of the retractable floor sections. However, the soiled scrapers remain in the upper section, exposed to environment, and permitting odor to permeate the air in the box.

U.S. Pat. No. 5,673,648 to Ayle discloses an animal litter box having a bottom tray and a tilted screen along one end. As the tray is tilted, the soiled litter is filtered through the screen and returns to the tray, while the soiled portion passes over the screen, through a waste chute and into a waste storage bag attached to the chute. The tray is lifted again to redistribute the filtered liter back through the screen and into the pan. However, any soiled particles sticking to the screen remain in the litter box so that the odor permeates the air in the box.

U.S. Pat. No. 5,785,000 to Barbary discloses a kitty litter assembly having a pan hinged at a forward end to dump the contents. A screen drawer is mounted under the pan and is pulled out to receive litter from the pan when the pan is tilted and a gate at the end opened. A collector pan under the screen drawer receives the filtered litter, so that it may be returned to the pan and reused. The screen drawer is removed from the assembly to dump the waste on the screen, and then returned for reuse. However, any soiled particles sticking to the screen are returned to the litter assembly, such that the odor permeates the air around the assembly.

While all of the above patents provide the capability of cleaning the litter box, several utilize screens that remain in the box, which retain odorous materials. Others permit the complete exchange of the litter, but the consumer must then put up with the smell of the waste material until such time as the entire litter pan may be dumped and refilled. Finally, most prior art litter boxes require the consumer to bend over to the floor in order to clean the box.

BRIEF SUMMARY OF THE INVENTION

It is therefore a general object of the present invention to provide an improved litter cleaning system for an animal litter box.

A further object of the present invention is to provide a litter cleaning system that permits period partial cleanings without requiring the replacement of all of the litter material.

Yet another object is to provide an improved litter system that provides periodic partial cleanings without the odors common with systems that use a screen to filter the materials.

Another object is to provide a litter cleaning system that is pleasant in appearance, and simple to use, and does not require the consumer top bend over while cleaning the litter pan.

These and other objects will be apparent to those skilled in the art.

The litter box cleaning system of the present invention includes an upright cabinet with a litter pan pivotally mounted in the upper end to move between a horizontal use position and a tilted dump position. A slot is formed in the pan front wall to dispense litter and waste material when the rearward end of the pan is lifted to the dump position. A waste receptacle in the cabinet is positioned below the pan slot such that litter and waste from the pan free-fall into the receptacle for storage and removal.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
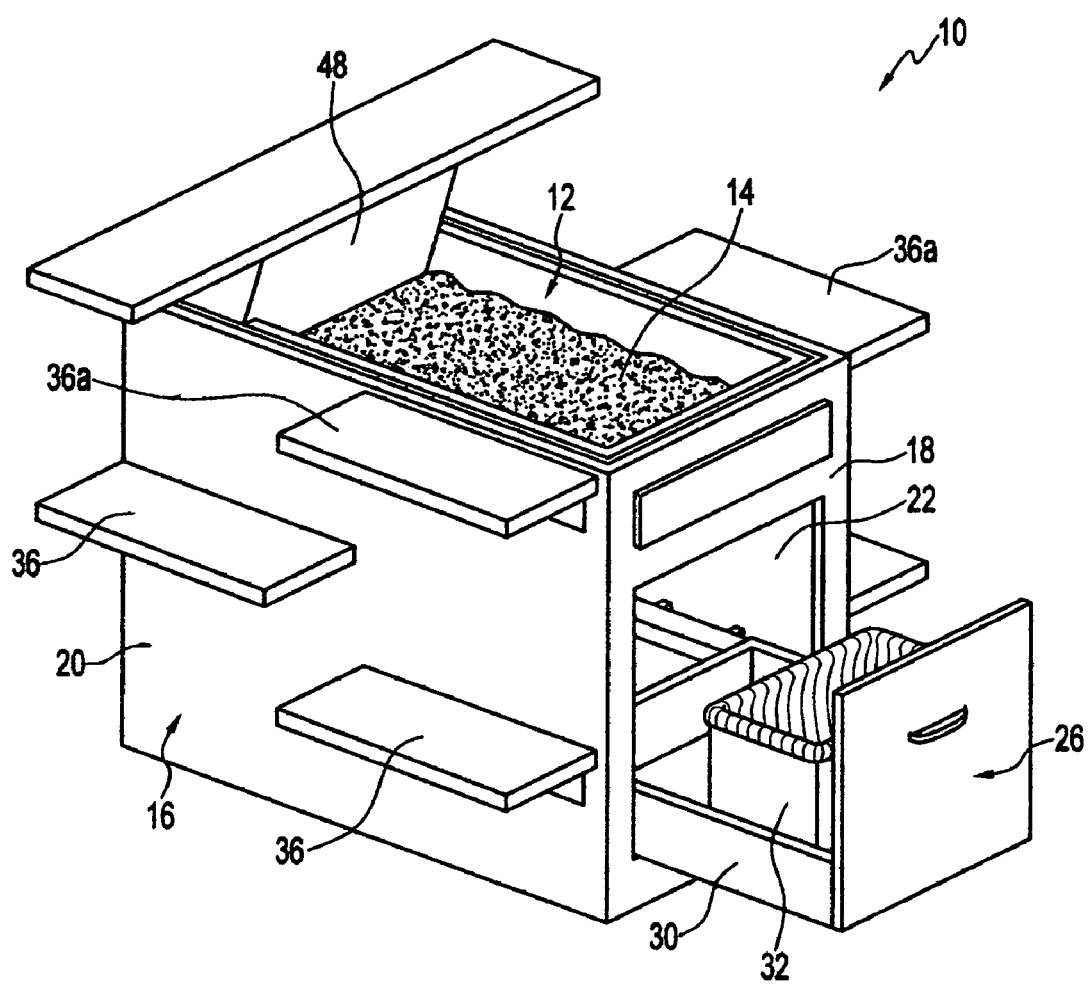
FIG. 1 is a perspective view of a litter box cleaning system of the present invention.

Referring now to the drawings, and more particularly to FIG. 1, the litter box cleaning system of the present invention is designated generally at 10, and includes a pan 12 with absorbent granular litter 14 therein, installed in the upper end of a cabinet 16. Cabinet 16 is preferably constructed as an article of furniture having characteristics similar to furniture in the room, to make the litter box unobtrusive, and a part of the overall aesthetic environment of the room. Preferably, cabinet 16 has a height the permits the consumer to effect the cleaning of the pan 12 without having to bend over during the cleaning operation.

Figure 2:
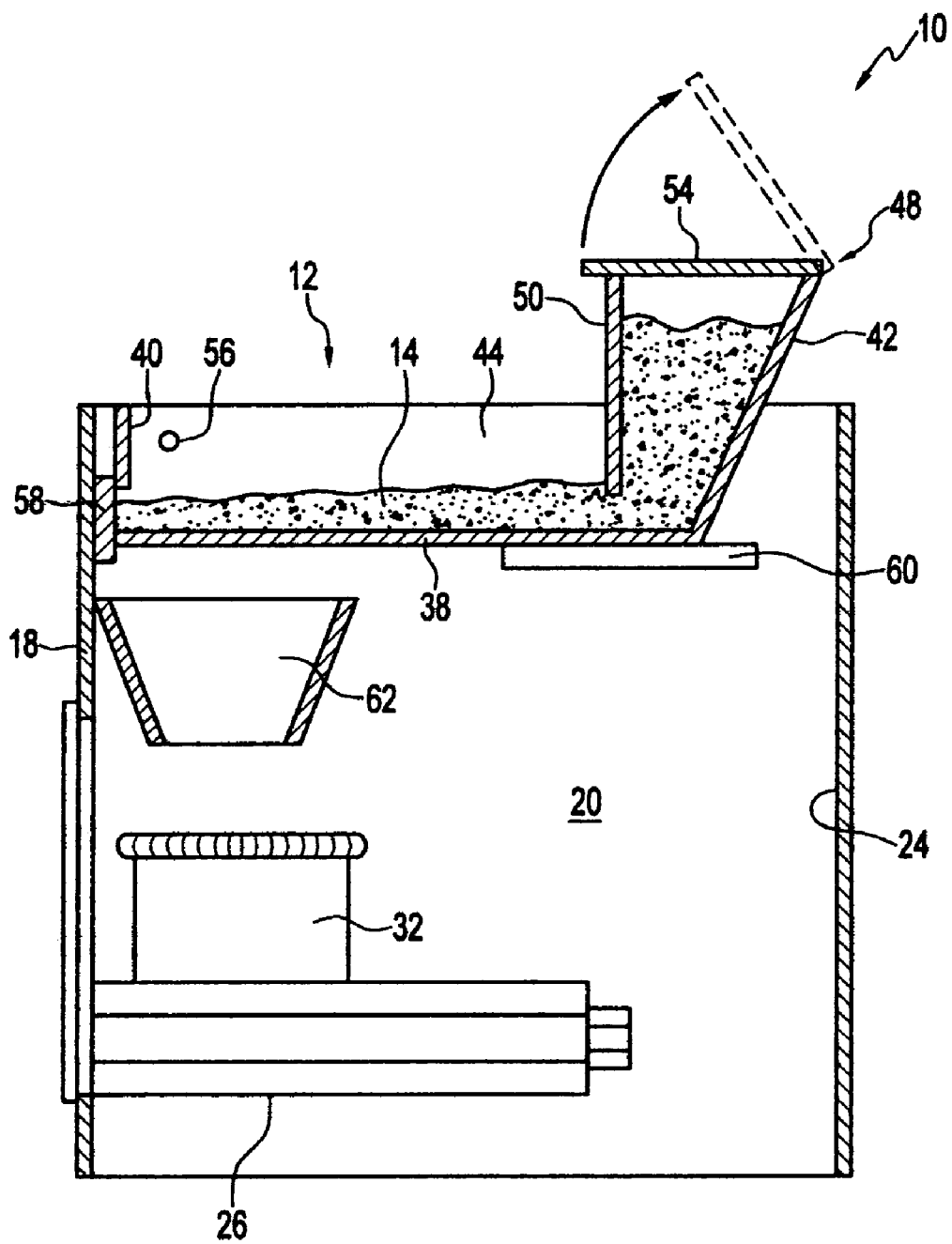
FIG. 2 is a vertical sectional view through the cleaning system.
Figure 3:
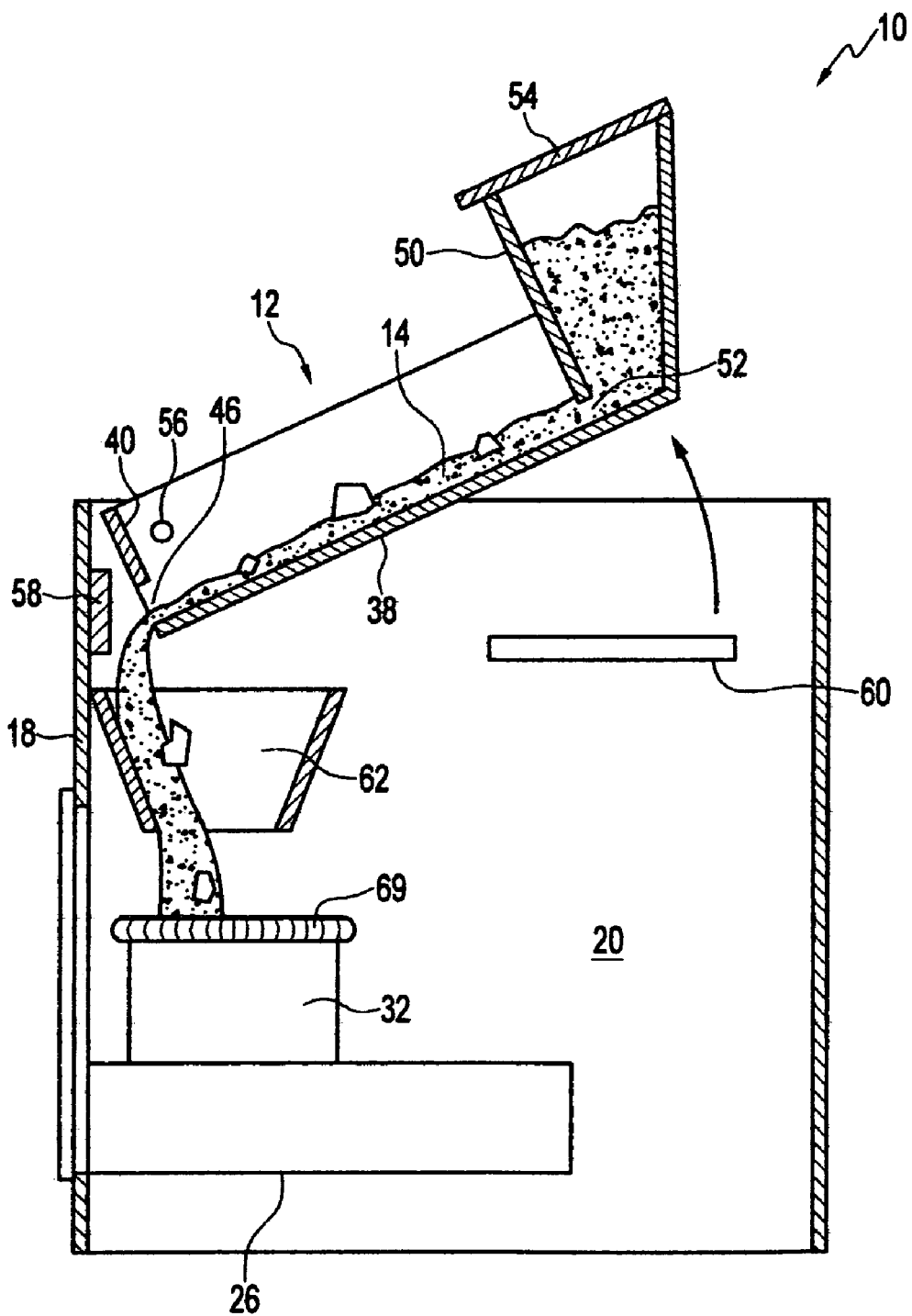
FIG. 3 is a vertical sectional view similar to FIG. 2, but with the litter pan pivoted to a dump position.

In the preferred embodiment of the invention, cabinet 16 includes a front wall 18, opposing sidewalls 20 and 22, and a rearward wall 24 (shown in FIGS. 2 and 3). A drawer 26 is operably mounted in the front wall 18 to slide outwardly to an open position, as shown in FIG. 1. Drawer 26 includes a front panel 28 and a box 30 for retaining a garbage can 32. Drawer 26 is mounted on rails 34 or any other conventional system to permit ease of operation.

A plurality of platforms 36 are mounted on sidewall 20, to permit cats to easily reach the litter pan 12 at the upper end of cabinet 16. Platforms 36 may be covered with carpet or any other related material. An upper platform 36a is preferably located on each of the opposing sides of pan 12, to permit easy access from either side.

Referring now to FIGS. 2 and 3, pan 12 has a solid bottom 38 extending between a front wall 40, rearward wall 42 and opposing sidewalls 44. Front wall 40 has a horizontal slot 46 formed in the lower portion thereof, directly above the bottom 38, to form a spout for dispensing litter 14 when moved to the dump position shown in FIG. 3. Rearward wall 42 extends upwardly beyond the upper edges of the sidewalls 44 to form the rearward wall of a projecting litter storage bin, designated generally at 48. A partition wall 50 extends between sidewalls 44, forwardly of the rearward wall 42, to form the front wall of bin 48. Portions of sidewalls 44 also extend upwardly between the partition wall 50 and rearward wall 42, to form the side of bin 48. Partition wall 50 is space above the bottom 38 to form a dispensing slot 52, which will dispense litter material from bin 48 to the interior of pan 12, once a sufficient amount of litter 14 has been removed from pan 12. A lid 54 is hinged to the upper end of bin 48, to permit easy access for refilling the bin 48.

Pan 12 is pivotally mounted on pivot pins 56 projecting outwardly from sidewalls 44, adjacent the front wall 40. In this way, the rearward end of pan 12 may be lifted to tilt the pan 12 and bottom 38 so that the contents of the pan will slide forwardly through the slot 46 in the pan front wall 40, and out of the pan 12, as shown in FIG. 3. A plate 58 is fastened to the inside face of the cabinet front wall 18, and located directly in front of slot 46 to abut the pan front wall 40 and the forward edge of bottom 38 and form a seal against spillage of litter 14, when pan 12 is in the use position shown in FIG. 2. A stop 60 is mounted on the cabinet sidewalls 20 and 22, directly below pan 12, to support the rearward end of pan 12 in the use position, generally horizontal within cabinet 16.

A funnel-shaped chute 62 is mounted within cabinet 16 directly below the forward end of pan 12, such that litter dispensed from slot 46 is directed by chute 62 downwardly into a garbage can 32 positioned in drawer 26, as shown in FIG. 3. Garbage can 32 preferably includes a special litter box liner 64 that permits the screening of waste and clumped litter from the "clean" litter material, thereby allowing for the reuse of the remaining clean litter. In any event, can 32 and liner 64 are spaced vertically below the lower end of chute 62 so that the litter 14 and any waste material within the litter, free-fall downwardly into the can 32. It has been found that the free-falling litter is important because free-falling litter covers any waste material, and "seals" the waste material in a coating of litter. This, in turn, prevents odor from escaping from the waste material, and provides a clean-smelling litter box and waste storage receptacle.

Figure 4:
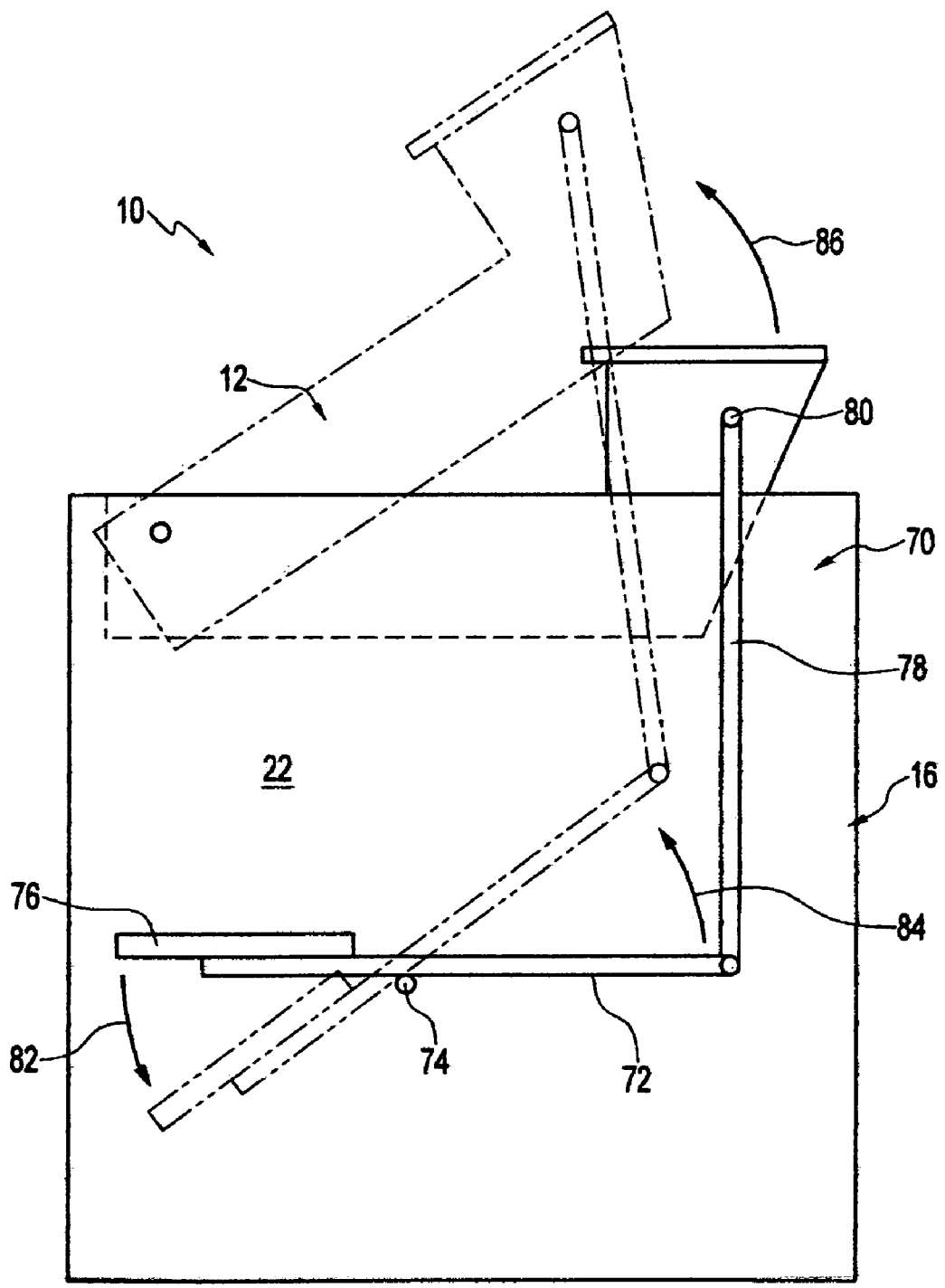
FIG. 4 is a side elevational view of the cleaning system, showing the activation assembly of the system.

Referring now to FIG. 4, the preferred embodiment of the cleaning system 10 includes a mechanical dump assembly, designated generally at 70. While the pan 12 may be pivoted to the dump position shown in broken lines in FIG. 4 by manually lifting the rearward end of the pan, the dump assembly 70, permits the consumer to have his hands free during the dump operation. This permits the consumer to assist in the period cleaning of the pan 12 by scraping through the litter 14 with a scoop or the like, if desired, while operating the dump assembly 70 with a foot.

Dump assembly 70 includes an elongated lever 72 pivotally mounted generally centrally to the sidewall 22 of cabinet 16, for pivotal movement in a vertical plane, about a horizontal pivot axis 74. A platform 76 is mounted on the forward end of lever 72 to generally match the platforms 36 on the opposing side of the cabinet (shown in FIG. 1), for aesthetics. The rearward end of lever 72 is hinged to the lower end of an upright arm 78, which is pivotally connected at its upper end to a pin mounted in the sidewall 44 of pan 12, proximal the rearward end. In this way, depressing platform 76 (as shown by arrow 82) will pivot arm 78 upwardly (as shown by arrow 84) and thence pivot the rearward end of pan 12 upwardly (as shown by arrow 86), to thereby dump the contents of the pan into the garbage can.

Referring once again to FIGS. 1–3, the litter box cleaning system 10 of the present invention is simply and easily operated. Litter material is constantly provided to pan 12 by bin 48, which may be filled by raising lid 54. A consumer may periodically clean pan 12 by raising the rearward end of pan 12, so that the pan pivots on pins 56 and thereby pulls slot 46 from its abutting sealed engagement with plate 58 it is not necessary to replace the entire contents of pan 12, but rather simply to cause the waste material, and surrounding litter 14 to pour out of slot 46 and drop to can 32. Simultaneously, fresh litter will enter pan 12 through slot 52 at the bottom of partition wall 50, so that the pan 12 is ready for use as soon as it is returned to the horizontal position of FIGS. 1 and 2.

Figure 5:
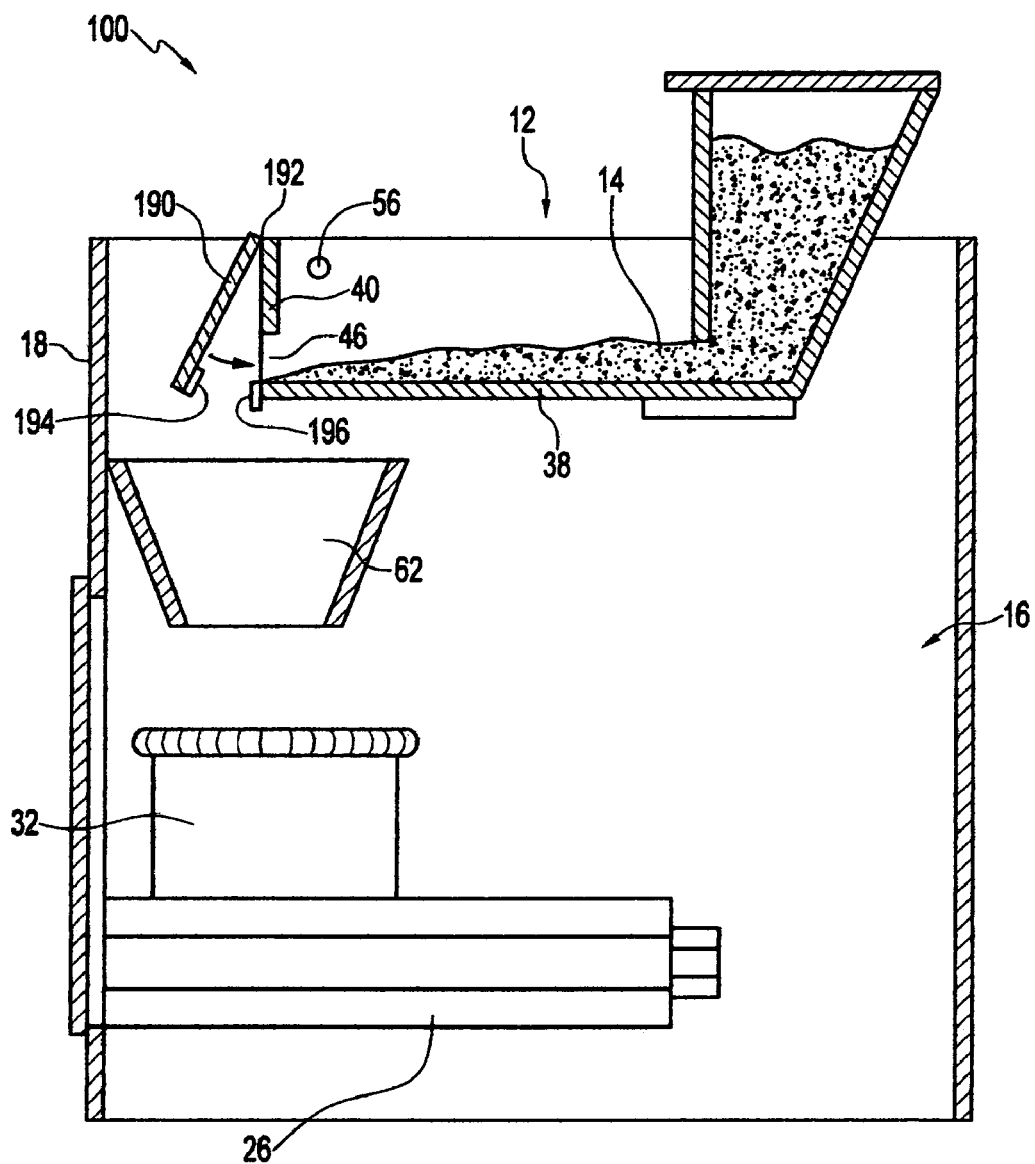
FIG. 5 is a vertical sectional view through a second embodiment of the cleaning system.

Referring now to FIG. 5, a second embodiment of the cleaning system of the present invention is designated generally at 100, and includes the same cabinet 16 with drawer 26 and waste receptacle 32 and chute 62. In the second embodiment, pan 12 is also constructed in the same fashion as the first embodiment, with a bottom 38 front wall 40, forward slot 46 and is pivotally mounted in cabinet 16 on pivot pins 56.

There are two major differences in the cleaning system 100 of the second embodiment, that distinguish it from the first embodiment. First, pan 12 is pivotally mounted in cabinet 16 spaced rearwardly from cabinet front wall 18, so that there is a space between the pan front wall 40 and cabinet front wall 18, for a purpose described in more detail below.

The second major difference is in the addition of a flap 190 pivotally connected at a hinge 192 along an upper edge to the front face of pan front wall 40. Flap 190 extends downwardly a distance to cover slot 46 and thereby prevent litter 14 from falling from slot 46. To insure a tight fit of flap 190 against slot 46, a small flat magnet 194 is mounted at the lower end of the rearward face of flap 190, and a small metal plate 196 is mounted in a corresponding position on the front edge of pan bottom 38. The magnet 194 is small enough to permit the flap to be easily pivoted outwardly by scraping a small pile of litter 14 against the flap 190 from the interior of pan 12. Thus, waste material and clumped litter may be easily and periodically removed from the pan 12 by using a scoop or spatula to push the unwanted material against flap 190 and out of pan 12. Flap 190 then returns to the sealed position by virtue of its own weight. Use of the dump assembly 70 (shown in FIG. 4) to tilt the pan 12 is then only needed when it is desired to clean all of the litter from the pan 12.

While the second embodiment of the invention is shown in combination with a pan 12 that is tiltable, it should be noted that this version of the invention would not require the pivotable connection of the pan 12 to the cabinet 16, nor the dump assembly 70 in order function adequately. In addition, flap 190 would not necessarily be required in order for the pan to function effectively. If flap 190 were removed, the consumer would simply fill the litter 14 to an extent that the pile does not extend completely across the pan bottom to pan front wall 40. It is still important, however, to have the waste receptacle located spaced vertically below the pan slot 46, so that waste material dropped into the waste receptacle is covered and sealed by litter 14 in the receptacle.

Whereas the invention has been shown and described in connection with the preferred embodiments thereof, many modifications, substitutions and additions may be made which are within the intended broad scope of the appended claims.

What is claimed is:

1. A litter box cleaning system, comprising:
   an upright cabinet having front and rear walls, opposing sidewalls and an open upper end;
   a pan having a bottom, forward and rearward walls and opposing sidewalls, pivotally mounted in the open upper end of the cabinet for movement between a generally horizontal use position and a tilted dump position;
   said pan front wall having a slot formed therethrough extending horizontally along and adjacent the pan bottom;
   said pan operably mounted in the cabinet with the front wall slot in abutting engagement with a portion of the cabinet front wall when in the use position, such that the pan front wall slot is blocked by the portion of the cabinet front wall;
   said pan having a generally horizontal pivot axis located proximal and parallel to the pan and cabinet front wall, and located proximal to and extending through an upper edge of the pan sidewalls, such that movement of the pan to the dump position raises the rearward end of the pan and pulls the pan front wall slot rearwardly away from the cabinet front wall to expose the pan front wall slot; and
   a waste storage receptacle located vertically below the pan front wall, to receive litter from the pan when moved to the dump position.

2. The litter box cleaning system of claim 1, further comprising a funnel-shaped chute interposed between the pan and waste receptacle, to direct waste and litter from the pan to the waste receptacle when the pan is in the dump position.

3. The system of claim 1, wherein said cabinet includes an access opening in one of said walls, to permit access to the waste receptacle for removing and replacing the waste receptacle.

4. The system of claim 3, wherein said cabinet includes a drawer mounted in the access opening, operable between a storage position within the cabinet, and an open position extending outwardly from the cabinet, said waste receptacle removably mounted within said drawer.

5. The system of claim 1, wherein said waste receptacle is vertically spaced below the pan a distance to cause litter material to cover any waste material that falls into the receptacle from the pan.

6. The system of claim 1, wherein said pan includes a litter storage bin formed in a rearward end of the pan with a lid operably mounted on the top of the bin to permit selective access to the bin.

7. The system of claim 6, wherein said bin includes a forward wall extending between the pan sidewalls and spaced above the pan bottom to form a slot communicating between the bin and the pan.

8. The system of claim 7, wherein said bin includes a rearward wall sloping forwardly from an upper end to a lower end, such that litter within the bin is directed towards the slot formed in the forward wall.

9. The system of claim 1, further comprising a dump assembly operable mounted on the cabinet and connected to the pan for moving the pan between the use and dump positions.

10. The system of claim 1, wherein said dump assembly includes:
    a lever having forward and rearward ends and pivotally mounted between the ends to one of the cabinet sidewalls for pivotal movement about a horizontal axis orthogonal to the cabinet sidewall; and
    an elongated arm pivotally connected at a lower end to the rearward end of the lever, and pivotally connected at an upper end to a sidewall of the pan rearwardly of the pan pivot axis.

11. A litter box cleaning system, comprising:
    an upright cabinet having front and rear walls, opposing sidewalls and an open upper end;
    a pan having a bottom, forward and rearward walls and opposing sidewalls, mounted in the open upper end of the cabinet for receiving granular litter material therein;
    said pan front wall having a slot formed therethrough extending horizontally along and adjacent the pan bottom;
    said pan mounted in the cabinet with the pan front wall spaced rearwardly away from the cabinet front wall, such that litter material in the pan falls downwardly through the pan front wall slot when the litter material is moved forwardly through the slot;
    a waste storage receptacle located vertically below the pan front wall, to receive litter from the pan exiting through the slot; and
    a flap hinged to a front face of the pan front wall and extending across the entirety of the pan front wall slot to block the contents of the pan from exiting the slot when in a closed position, and permitting the contents of the pan to fall from the slot when pivoted outwardly on the hinge.

12. The system of claim 11, wherein:
   said flap includes a flat magnet attached to a rearward face thereof, and
   said pan front wall includes a flat metal plate thereon located to correspond with the magnet when the flap is in the closed position.

13. The system of claim 11, wherein said pan includes a generally horizontal pivot axis located proximal and parallel to the pan and cabinet front walls, and located proximal to and extending through an upper edge of the pan sidewalls.

14. The system of claim 11, wherein said waste receptacle is vertically spaced below the pan a distance to cause litter material to cover any waste material that falls into the receptacle from the pan.

15. A litter box cleaning system, comprising:
   an upright cabinet having front and rear walls, opposing sidewalls and an open upper end;
   a pan having a bottom, forward and rearward walls and opposing sidewalls, mounted in the open upper end of the cabinet for receiving granular litter material therein;
   said pan front wall having a slot formed therethrough extending horizontally along and adjacent the pan bottom;
   said pan mounted in the cabinet with the pan front wall spaced rearwardly away from the cabinet front wall, such that litter material in the pan falls downwardly through the pan front wall slot when the litter material is moved forwardly through the slot;
   said pan including a litter storage bin formed in a rearward end of the pan with a lid operably mounted on the top of the bin to permit selective access to the bin;
   said bin including a forward wall extending between the pan sidewalls and spaced above the pan bottom to form a slot communicating between the bin and the pan; and
   a waste storage receptacle located vertically below the pan front wall, to receive litter from the pan exiting through the slot.

16. A litter box cleaning system, comprising:
   an upright cabinet having front and rear walls, opposing sidewalls and an open upper end;
   a pan having a bottom, forward and rearward walls and opposing sidewalls, mounted in the open upper end of the cabinet for receiving granular litter material therein;
   said pan front wall having a slot formed therethrough extending horizontally alone and adjacent the pan bottom;
   said pan mounted in the cabinet with the pan front wall spaced rearwardly away from the cabinet front wall, such that litter material in the pan falls downwardly through the pan front wall slot when the litter material is moved forwardly through the slot;
   said pan pivotally mounted in the open upper end of the cabinet for movement between a generally horizontal use position and a tilted dump position with a rearward end of the pan raised higher than a forward end of the pan;
   a dump assembly operable mounted on the cabinet and connected to the pan for moving the pan between the use and dump positions;
   a waste storage receptacle located vertically below the pan front wall, to receive litter from the pan exiting through the slot; and
   said dump assembly includes including:
      a lever having forward and rearward ends and pivotally mounted between the ends to one of the cabinet sidewalls for pivotal movement about a horizontal axis orthogonal to the cabinet sidewall; and
      an elongated arm pivotally connected at a lower end to the rearward end of the lever, and pivotally connected at an upper end to a sidewall of the pan rearwardly of the pan pivot axis.

* * * * *